June 21, 1966 E. R. HOYT 3,257,253
LAMINATED CELLULAR PANEL
Filed April 15, 1963 8 Sheets-Sheet 3
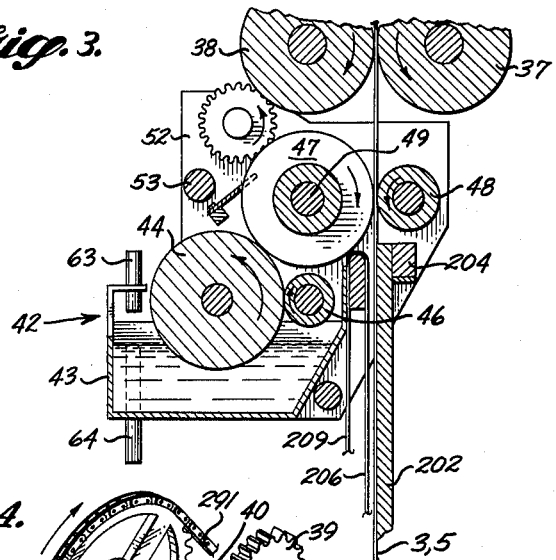
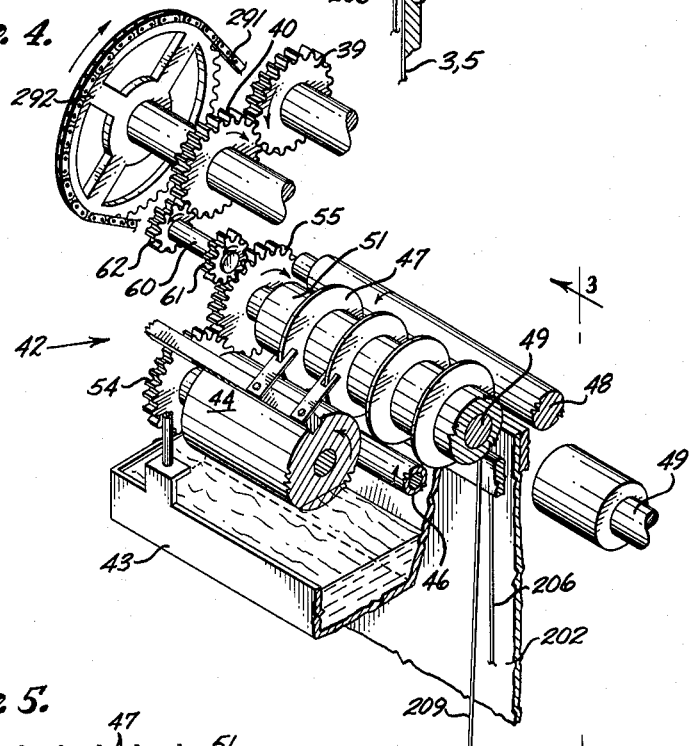
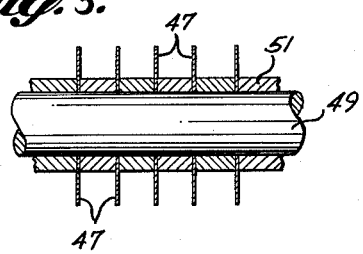
INVENTOR.
EDWIN R. HOYT
BY
ATTORNEYS June 21, 1966 E. R. HOYT 3,257,253
LAMINATED CELLULAR PANEL
Filed April 15, 1963 8 Sheets-Sheet 4
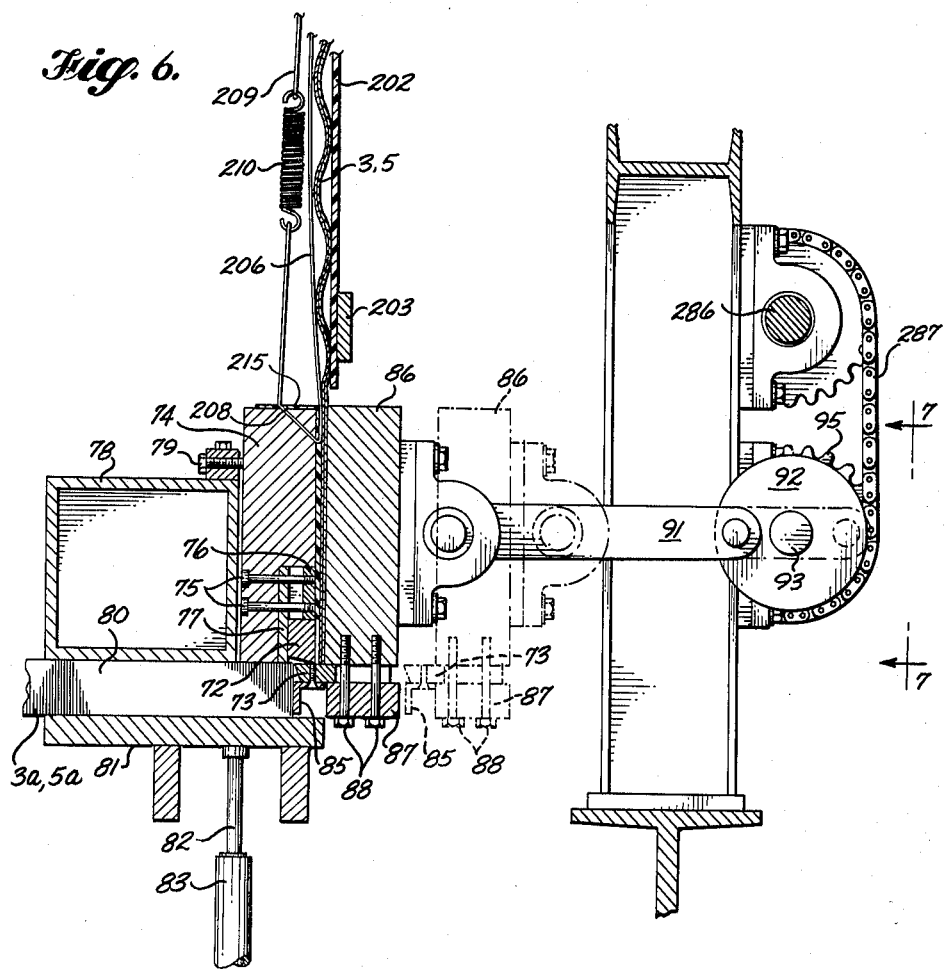
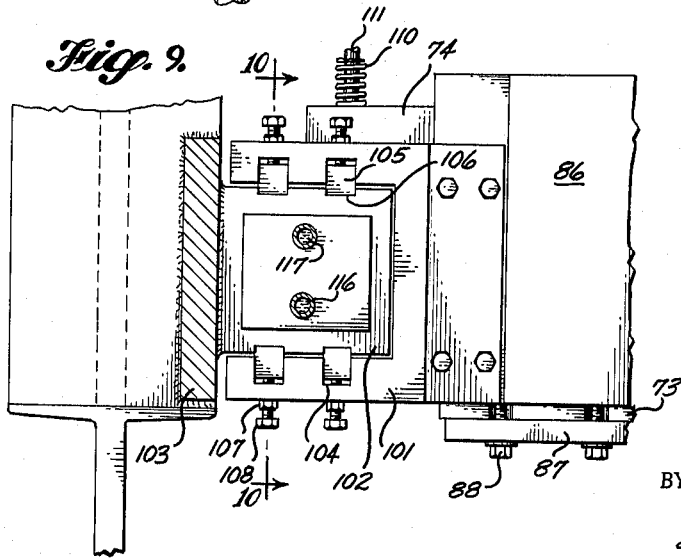
INVENTOR.
EDWIN R. HOYT
ATTORNEYS

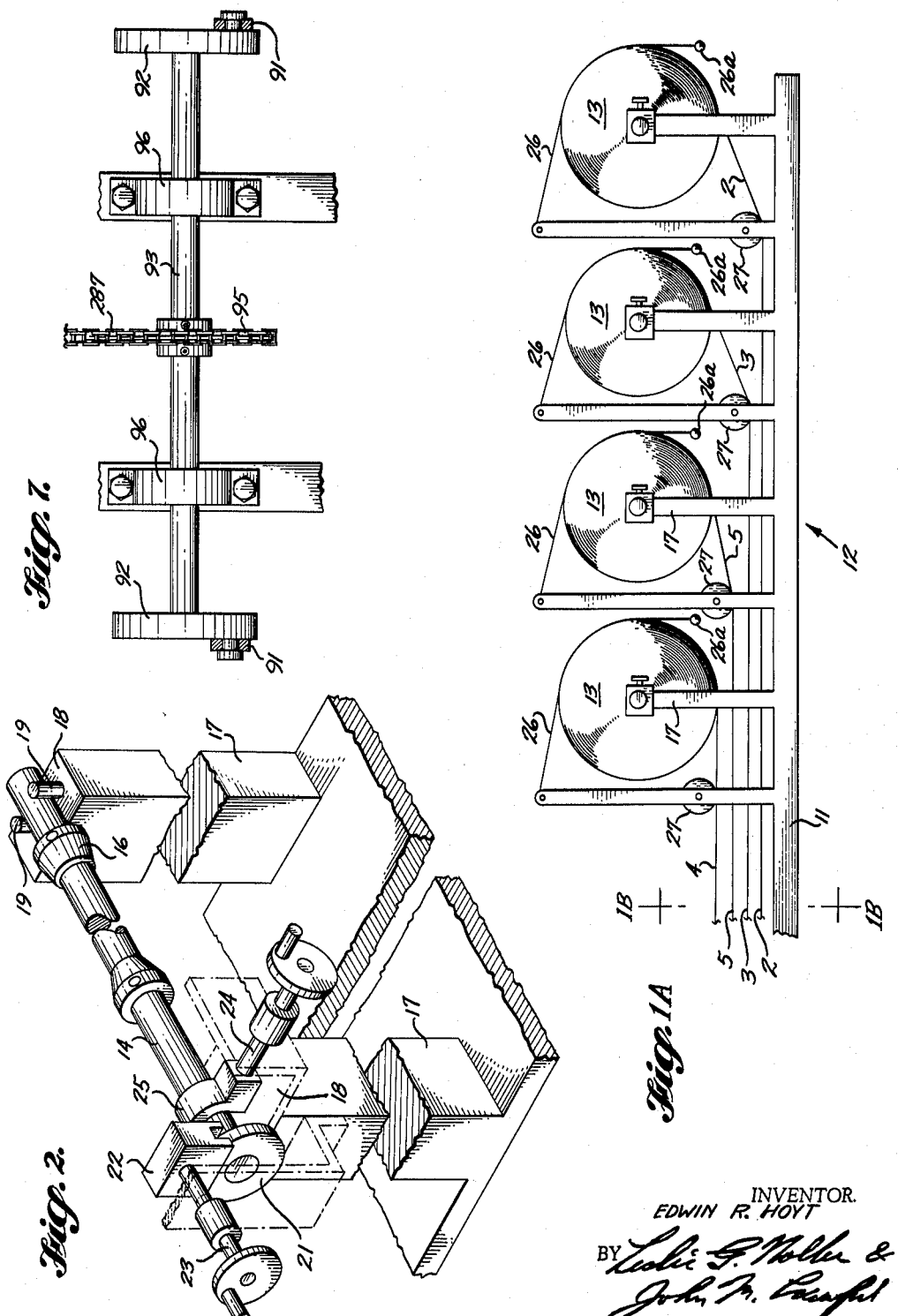

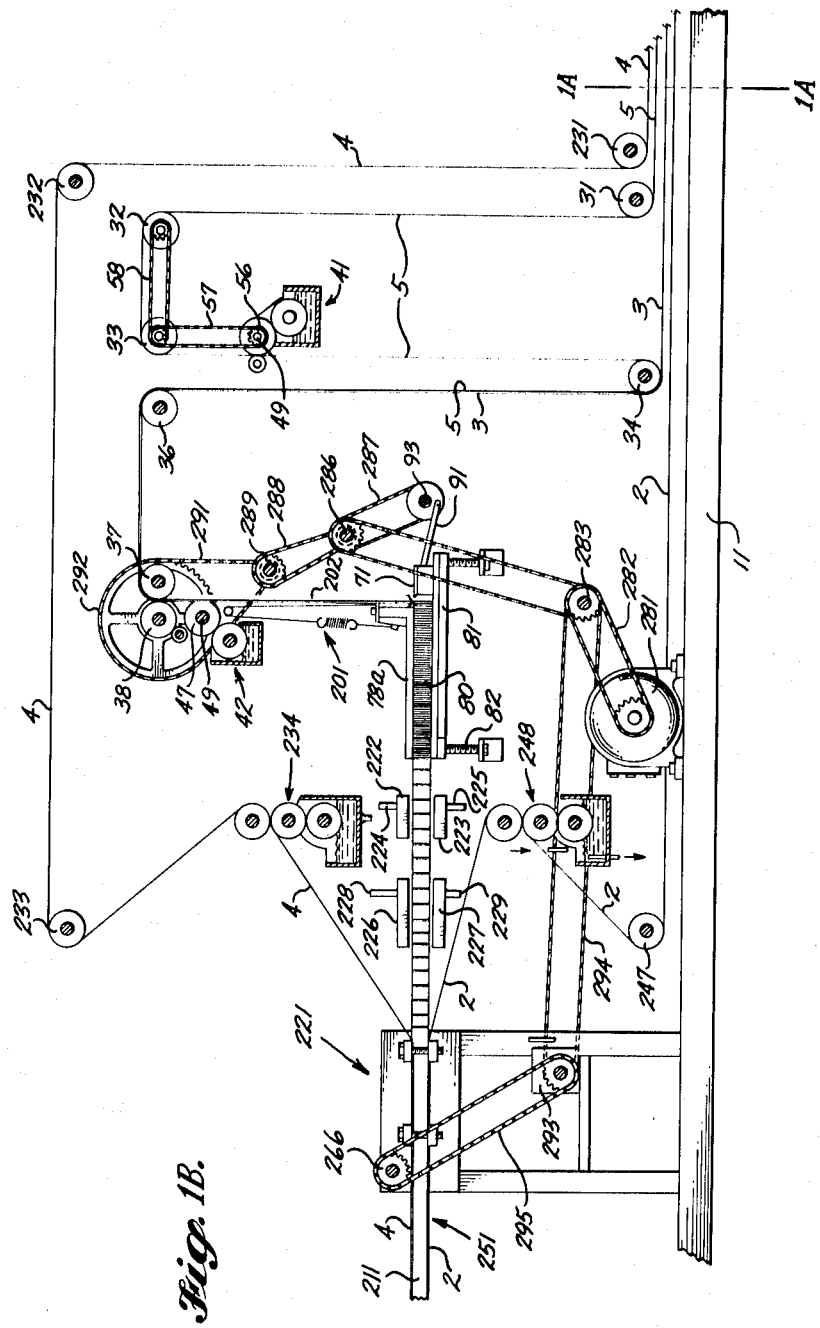

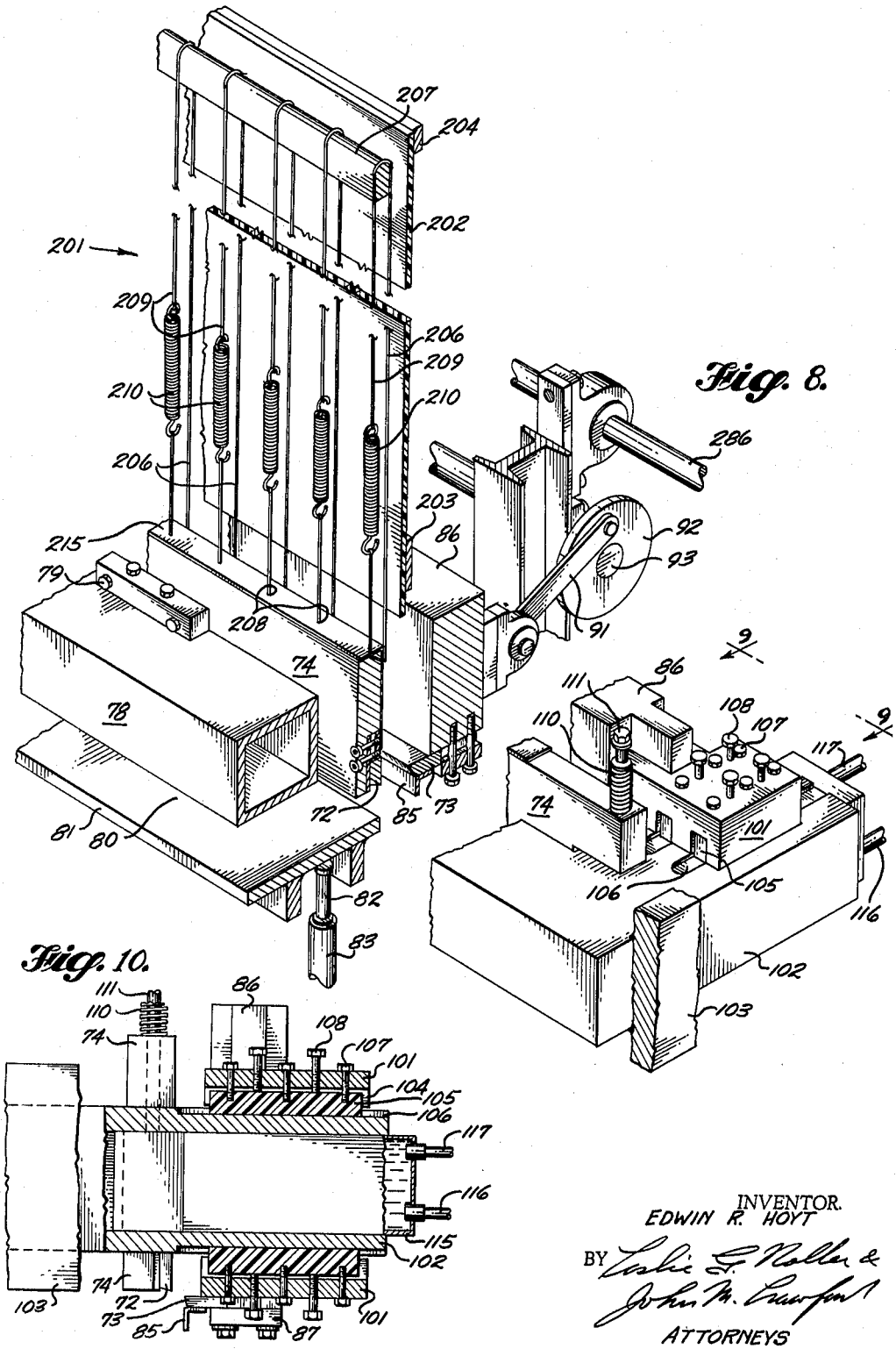

June 21, 1966  E. R. HOYT  3,257,253
LAMINATED CELLULAR PANEL
Filed April 15, 1963  8 Sheets-Sheet 6
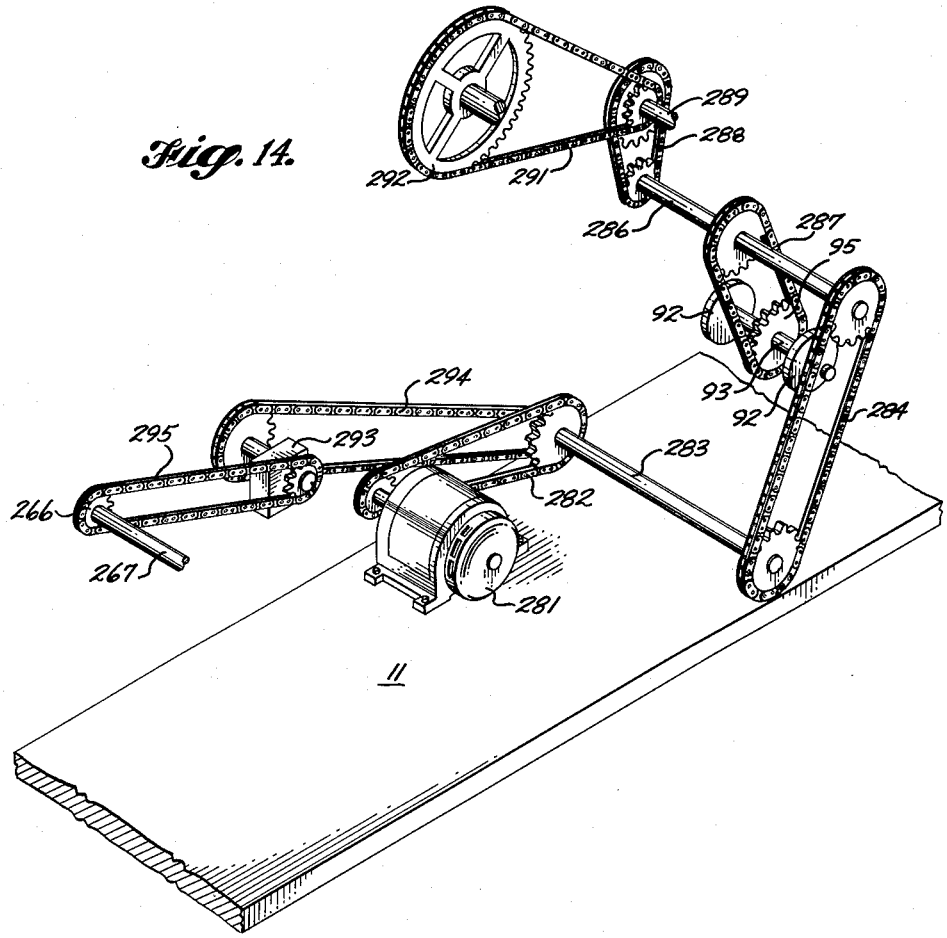
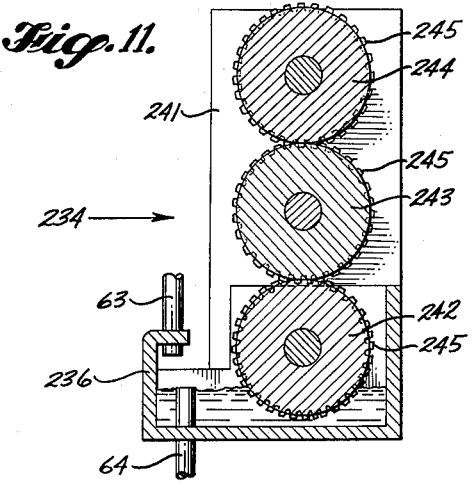
INVENTOR.
EDWIN R. HOYT
BY
ATTORNEYS June 21, 1966 E. R. HOYT 3,257,253
LAMINATED CELLULAR PANEL
Filed April 15, 1963 8 Sheets-Sheet 7

INVENTOR.
EDWIN R. HOYT
BY
ATTORNEYS

June 21, 1966  E. R. HOYT  3,257,253
LAMINATED CELLULAR PANEL
Filed April 15, 1963  8 Sheets-Sheet 8

INVENTOR.
EDWIN R. HOYT
BY
ATTORNEYS

United States Patent Office 3,257,253
Patented June 21, 1966

3,257,253
LAMINATED CELLULAR PANEL
Edwin R. Hoyt, Centralia, Wash., assignor to Weyerhaeuser Company, Tacoma, Wash., a corporation of Washington
Filed Apr. 15, 1963, Ser. No. 273,244
7 Claims. (Cl. 156—256)

This invention relates to a laminated panel, its cellular core, an incremental process for making such core and panel, and a machine for the performance of the process and the production of such core and panel.

This application is a continuation-in-part of my copending application Serial No. 181,624, filed March 22, 1962.

The invention is primarily concerned with an all-paper panel wherein the cellular core is made from one or more webs of paper and the core has either one or both of its opposite faces secured to another web or webs of paper which are referred to as face sheets. The core is made up of sinuous strips of paper in face-to-face registery with the nodes of adjacent strips secured together. The core preferably has the general shape and appearance of a honeycomb and is commonly referred to as honeycomb. The invention is not limited to paper, however, as the webs used in the construction of the panel, or at least certain of these webs, may be made of other suitable flexible materials.

Heretofore the manufacture of such cellular core panels has been relatively slow and costly. The methods employed do not lend themselves readily to machine operations whereby excessive manual handling of the material was required. Although machines have been proposed to perform certain phases of the operation, no machine has heretofore been developed to carry out the complete operation from rolls of paper to the finished panels. Also, the methods usually employed made it difficult, if not impossible, to obtain a uniform thickness of core even by machine operation. In order to utilize fully the advantages of cellular construction and to provide a quality product, the core must be of uniform thickness.

The general objects of the invention are, therefore, to produce a continuous cellular honeycomb structure and a continuous laminated cellular panel having greater uniformity in all respects and higher quality than cellular panels heretofore produced. Other general objects are to provide an improved process for making such honeycomb and panels and to provide an improved machine for carrying out the process.

More specific objects are to produce core cells with a high degree of uniformity of shape and dimensions in longitudinal and transverse directions, to provide a core of uniform thickness, and to provide a new and improved process for forming the core and the complete panels by continuous incremental integration from rolled web material and to provide an improved machine for carrying out the process.

Additional objects are to provide improvements in the process steps and means of cutting and placing strips of web material to form honeycomb stock or pack, to provide improved process steps and means for uniformly expanding the honeycomb stock or pack into the desired cellular configuration, and to provide an improved process step and means for feeding the core web or webs to the cutting operation in intermittent movement from a continuous web feed movement.

Further objects are to form a honeycomb structure by the successive cutting, stacking and adhering of strips from a continuous core web or webs one after another by an incremental procedure, to provide a process for making honeycomb and cellular core panels which may be carried out in high speed operation and to provide a machine which is capable of carrying out the process at high speed. Still another object is to provide a machine for the purpose described which is not excessively complicated and expensive to build and which will give trouble-free performance over a long period of time with a minimum of maintenance and upkeep.

The present process is a continuous process of integration starting with rolls of plain paper or other suitable flexible web material and ending with a continuous ribbon of laminated cellular core panel which may be cut to any length desired. The core is produced by cutting strips one after another from the core web or webs and joining them to previously cut strips by continuous incremental integration whereby the strip cutting knives cut only a small number of web thicknesses at a time such as two, three, or more thicknesses. This insures a uniform width of strips and avoids the great difficulty heretofore experienced in cutting large pre-assembled core blocks with powerful guillotine-like knives which invariably produce core slices of non-uniform thickness. An important feature of the invention comprises a novel core web takeup wherein the core web material is fed intermittently to the cutting operation from a continuous web feed movement.

While the core may be made from two, three, or more separate webs, two core webs are shown by way of example in the present case. Prior to the cutting of the strips a first core web has continuously applied to one face thereof spaced-apart parallel lines or strips of adhesive running parallel to the length of the web. A second core web is fed to and adhered to the first web by such adhesive lines. Similar adhesive lines are then applied to the opposite or free face of the first web, these second lines being medially interposed between the first lines. This composite two-ply web is then fed to the strip cutting knife which operates transversely of the web length to sever narrow congruent strips (one inch wide, for example) therefrom in rapid succession.

As each strip is severed from the composite web, it is packed against the previously severed strip in face-to-face registry so that the free face adhesive lines hold and set them together and so that the first applied adhesive lines hold and set together the strips of the first and second webs. The resistance for the packing of the strips is obtained by packing them into a packer throat so constructed and adjusted that its sides apply pressure in opposition to the long edges of the strips. A stack of the webs is thus built and such stack may be a few inches to one or two feet in its length dimension normal to the strip faces. The stack length may be varied in accordance with the time needed to set the adhesive lines. It will be apparent that the described stack of adhered strips may be built with the adhesive lines applied to the web faces in a number of different ways since either of two webs to be adhered together may carry the adhesive.

As new strips are added to one end of the stack, the adhered strips are withdrawn from the other end of the stack in an expanding zone wherein the strips are pulled apart sufficiently to open the cells formed between the lines of adhesive. Upon expansion each strip takes a wavey or sinusoidal shape with adjacent strips joined together at opposed nodal positions with the formation of open cells between the strips resembling a honeycomb. The degree of expansion determines the shape of the cells and a feature of the invention is the attainment of uniform cell shapes and dimensions in the direction of expansion and the transverse direction. When the strips are cut to uniform width and the cells are expanded uniformly, the resulting core will be uniform in all respects which is an optimum condition to be achieved in the manufacture of the panels. The present honeycomb is adapted for a wide variety of uses and, for example, may involve thicknesses from half an inch to several feet and cell diameters from one-half inch up.

Cellular expansion as above described is accomplished in an expander unit spaced from the packer. The expander comprises upper and lower belts which grip the strip edges therebetween and are driven at a rate which will taken the strips from the packer and separate them to give the desired separation and cell size for an open cell core. Between the packer and the expander the core is preferably treated by humidification and/or heating to relieve the stresses therein caused by the expansion and to set the core so that such stresses will not cause the core to collapse by the cells again closing, which would occur in varying degree if the core were to pass through the expander without receiving the face sheets thereon or without such treatment.

If one or more face sheets are secured to the core, this is done in the expander by simultaneously and continuously feeding both core and face sheets in contact to the expander, adhesive being applied between each sheet and the core to obtain adhesion therebetween and integration thereof. The adhesive sets sufficiently in the expander so that the core and face sheets emerge therefrom as a unitary structure in ribbon form which may be cut to desired length.

The invention will be better understood and the foregoing and additional objects and advantages will become apparent from the following detailed description of the process in connection with the machine illustrated in the accompanying drawings. Various changes may be made, however, in the construction and arrangement of parts and certain parts may be used without others with corresponding variation in the steps of the process. All such modifications within the scope of the appended claims are included in the invention. All references to specific dimensions are given by way of example only and are not intended in a limiting sense.

In the drawings:

FIGURES 1A and 1B are a left side elevational schematic view, with parts broken away and simplified, of a machine embodying the present invention;

FIGURE 2 is a detailed isometric view of a single paper roll unwind stand;

FIGURE 3 is an elevational sectional view of the second adhesive line applicator taken on the line 3—3 of FIGURE 4 and with adjacent parts of the machine;

FIGURE 4 is an isometric view partly in section of the second adhesive line applicator and the line applicator drives and parts of the web take-up;

FIGURE 5 is a longitudinal partial sectional view of the line applicator disc assembly;

FIGURE 6 is a fragmentary elevational sectional view of the strip cutter and web take-up;

FIGURE 7 is a fragmentary rear view of the strip cutter crankshaft taken on the line 7—7 of FIGURE 6;

FIGURE 8 is a fragmentary isometric view of the web take-up and strip cutter with parts broken away;

FIGURE 9 is a fragmentary elevational view of the cross head bearing support for the movable cutter, with parts in section, taken on the line 9—9 of FIGURE 8;

FIGURE 10 is a sectional view taken on the line 10—10 of FIGURE 9;

FIGURE 11 is an elevational sectional view of one of the adhesive face applicators taken medially of the applicator from the aspect of FIGURE 1B;

FIGURE 14 is a schematic isometric view of the power distribution system;

*The machine assembly*

Figure 12:
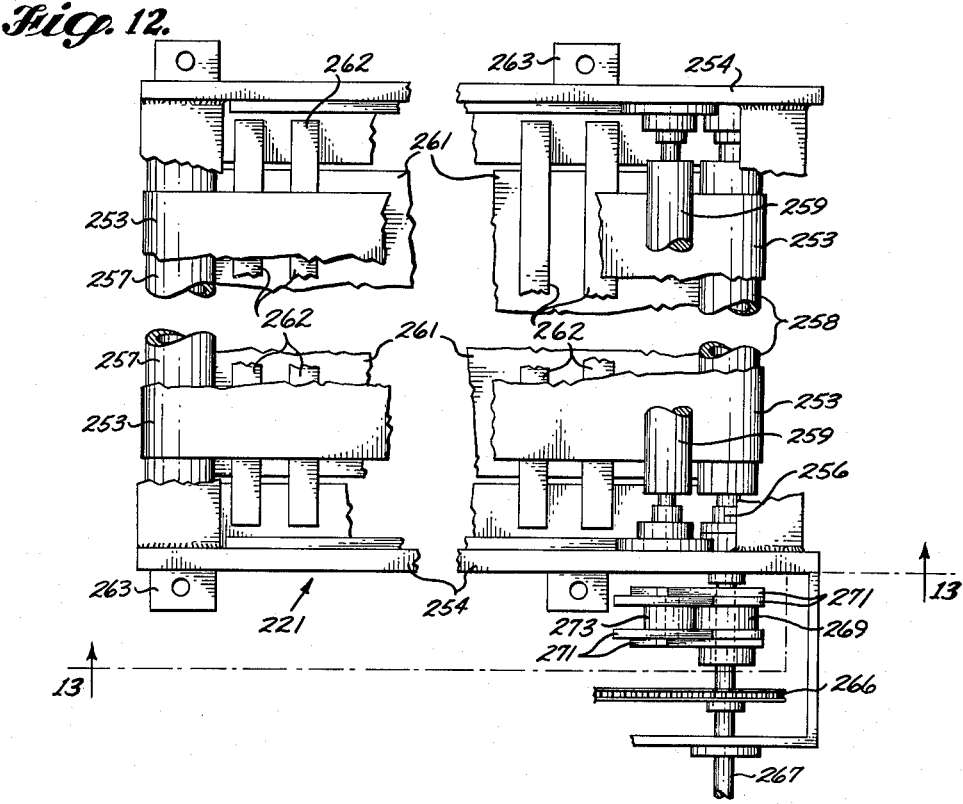
FIGURE 12 is a plan view of the expander with parts broken away.

FIGURES 1A and 1B together form a left side view of a machine assembly embodying the present invention, FIGURE 1A showing the back or infeed end and FIGURE 1B the front or outfeed end of the machine. These views are partly schematic in that various frame members and support parts for machine elements have been eliminated. This is particularly true of the supporting means for the threading rolls and the guide rolls for the various webs and sheets. All the elements of the device are shown as mounted on a single bed member 11 with various upright and bracing members not shown.

*Roll unwind stand*

At the rear or web feed end of the machine shown in FIGURE 1A there is a roll unwinding stand 12 with supports for four rolls of paper 13. The webs or sheets from the rolls 13 are separately designated as: the lower or bottom face sheet 2 taken from the rearward roll; the upper or top face sheet 4 from the forward roll; and lower, 3, and upper, 5, core stock webs taken from the two middle rolls. No difference in the structure of the paper is intended by the use of the different terms "sheet" and "web." Only differences in use are intended, "web" designating core stock and "sheet" designating face sheet stock, for clarity of description.

Each roll 13 of paper has a shaft 14 therethrough that has each end thereof supported on a pedestal upright from bed 11. As shown in FIGURE 2 a cone shaped collar 16 is locked to the shaft to center the roll of paper and prevent its shifting thereon. The upper end of each right and left pedestal 17 carries a flat bearing plate 18 on which one end of each of the shafts rests.

Projecting upward from the face of the right hand bearing plate is a pair of round shaft guide pins 19 spaced apart to carry therebetween the shaft 14 so that it may have pivotal movement on the plate 18. The left hand end of shaft 14 may be moved on its bearing plate either forward or backward or endwise while the right hand end is constrained against forward or backward movement by the pins 19.

Endwise movement of the shaft 14 is produced by a yoke 22 which engages the shaft end collar 21 and is movable endwise of the shaft in either direction by a screw 23 threaded in a bracket carried by the left hand pedestal 17. Forward and backward movement of the shaft end is produced by a similar screw 24 threaded in a pedestal bracket and carrying a hock or a yoke 25 that engages the shaft. Each of the two adjusting screws is rotatable in its yoke. With this arrangement for each of the four shafts, each roll of paper may be adjusted so that the web or sheet as it unwinds therefrom will track properly into the machine. Such mounting and adjusting of the paper rolls is old in the art of paper utilization and there are various possible modifications thereof.

Each of the rolls of paper is provided with a drag in the form of a strip of canvas 26 or belting lying on the upper portion of the roll. One end of the drag is fixed above and rearward of the roll and the other end hangs below and forward of the roll. The hanging end is provided with a bight 26a to afford the desired drag on braking on the rotation of its paper roll and prevent overrunning of the roll whereby the sheet or web may be tensioned as it is pulled from its roll. Below each of the paper rolls is a roll stand threading roll 27 under which the web from that roll passes as it leaves the roll on its movement rearward of the machine.

*Adhesive lines to core stock*

As shown in FIGURE 1B, the upper core stock web 5 is led from the roll stand 12 under a first foot threading roll 31 to the top of the machine frame and over spaced-apart head threading rolls 32, 33 and down to and under a second foot threading roll 34 where it is contacted by and combined with the lower core stock web 3. The combined core stock webs 3 and 5 leave the roll 34 in registry and pass upward over a third core stock head threading roll 36. From this roll the core stock webs pass over a first nip roll 37 and then downward to a strip cutter. Opposed to the first nip roll 37 is a second nip roll 38 which bears on the combined core stock webs and forces them against the first nip roll. These nip rolls furnish the drive for the core stock webs and maintain the same peripheral speed by each having coaxial and integral therewith a spur gear 39, 40 with the gears in mesh with each other. (See FIGURE 4.)

Adhesive lines are applied to the under side of the upper core stock web 5 as it leaves the unwind stand in its run downward between its second head threading roll 33 and its second foot threading roll 34 by means of a first applicator 41. Adhesive lines are applied to the other side of the web 5 by means of a second applicator 42 located just below the constant speed nip rolls 37, 38. Each of these applicators is of the same construction and operation except that the ends have been reversed one with respect to the other and the first one is chain driven while the second one is gear driven. Thus, the description of one of the applicators, the second one 42 shown in FIGURES 3, 4 and 5, is sufficient for an understanding of both.

Essentially, each of the adhesive applicators 41, 42 comprises an adhesive pan 43 from which a pickup roll 44 takes the adhesive, a doctor roll 46 in contact with the pickup roll, and a series of spaced-apart coaxial applicator discs 47 which are in edge contact with the pickup roll and a face of the web. As the discs rotate they transfer adhesive from the pickup roll to the web in the form of a series of parallel lines. The first adhesive applicator 41 applies its said adhesive lines to the side of web 5 that is to be contacted by the other core stock web 3, and the second applicator 42 applies its lines to the other side of the same web 5. The two applications are located transversely to the web 5 so that the lines applied by one on one face of the web are centered between the lines of the other on the opposite face.

Holding the web to the edges of the applicator discs 47 is a backup roll 48 which is rotatably driven by the web. The discs 47 are coaxial of, internally in contact with and carried by, a mandrel 49, and are spaced apart by cylindricl rings 51 that slide on the mandrel with the whole assembly of discs and rings being secured together by fixing the outer rings to the mandrel. The pickup roll, doctor roll, mandrel and backup roll are supplied with suitably journaled shafts at each end thereof which have bearings in or secured to a plate 52 at each end of the applicator. These plates are held in fixed spaced-apart relationship by tie rods 53 therebetween, and the whole assembly is mounted on brackets secured to the frame of the complete machine. Pickup roll 44 and the mandrel 49 for the applicator discs are provided with gears 54, 55 coaxial of and secured thereto with the two gears in mesh so that the peripheral speeds of the roll and discs will be the same. The doctor roll 46 is driven by contact with the pickup roll and contacts the upward moving surface of the pickup roll before it is contacted by the applicator discs.

The applicators are driven so that the peripheral speed of the discs 47 is the same as the speed of the web and this is done at the first applicator 41 by securing a sprocket 56 to the mandrel end shaft opposite the gear 55 and driving it by a chain 57 from the adjacent head threading roll 33. To reduce slippage between the web and the applicator discs to the first applicator 41 both of the head threading rolls 32, 33 are linked together by another chain 58. The second applicator 42 is driven by an idler shaft 60 journaled in an end plate 52 and having at one end of the shaft a spur gear 61 in mesh with the gear 55 fixed to the mandrel, which meshes with the pickup roll gear 54. The other end of the idler shaft, which is outboard of the end plate, carries another spur gear 62 that is in mesh with the gear 40 integral with the nip roll 38.

By the above chain and gear drives, the applicator discs are driven so that their peripheral speed is the same as the lineal speed of the combined core stock webs 3, 5. These two webs are first brought together at the foot threading roll 34 and are thereafter integrated by the adhesive lines of the first applicator 41 as such lines are then between the webs. These adhesive lines have time to partially set as the webs travel together to the second adhesive line applicator 42 and thence to the strip cutter 71. Each of the adhesive applicators shown herein has liquid adhesive circulated through its pan by the delivery thereto through a conduit 63 and the overflow therefrom through a conduit 64 of such adhesive.

*Strip cutter*

The combined core stock webs 3, 5 move vertically downward from between the powered constant speed nip rolls 37, 38 a distance of about four feet to the strip cutter 71 which is cyclically operated. The cyclic operation of the cutter requires a takeup for the slack in the webs resulting from their momentary stoppage during each cutting cycle. This distance between the nip rolls and cutter is utilized for a takeup mechanism which is hereinafter described.

As shown in FIGURES 6 and 8, the core strip cutting mechanism has a fixed cutter blade 72 with a horizontal cutting edge and a cooperating blade 73 with a vertical cutting edge that is reciprocated so that the edges of the blades are passed one with respect to the other in cutting relationship. Each of the blades extends transversely of the machine frame and across the webs as they move downward between the blades. The fixed blade is mounted on a rigid mounting plate beam 74 that extends transversely of the machine and is supported at its ends by the frame of the machine. Mounting plate 74 is provided with a recess in its rearward bottom corner to receive the blade 72. The blade is secured by cap screws 75 threaded into a plate 76 attached to the top edge of the blade. The cap screws draw the blade against a wedge shim 77, the purpose of which will be presently described. Mounting plate 74 is backed up by a horizontal box beam 78 on the frame of the machine which has set screws 79 bearing against the rear side of the mounting plate. The bottom surface of mounting plate 74 forward from the blade 72, and the bottom surface of beam 78, form the top face of the entrance portion of a horizontal throat 80 that contains the strips severed from the combined webs. The rest of the top face of the throat is formed by a top throat plate 78a (FIGURE 1B).

This throat 80 may be called the packer throat as the strips are packed therein to give contact therebetween while the adhesive from the second applicator 42 is given time to set. The bottom face of the packer throat is formed by a horizontal plate 81 that is in opposition to the aforementioned top face of the throat and spaced therefrom the width of the severed strips. This bottom plate 81 of the throat extends rearward of the top face a distance sufficient to provide a stop for the cut edge of the combined core webs 3, 5 as they are fed downwardly from the nip rolls and the second adhesive applicator. Thus, the bottom plate 81 also serves as a gauge for determining the width of the strip to be severed from the core web.

Bottom plate 81 is mounted for vertical adjustment on a series of screws 82 which have threaded engagement with supporting cylinders 83. The screws are adjusted to set the strip width whereby a drag is exerted on the strips in the throat so that they will be firmly packed together. This packing of the strips is accomplished by the movable blade 73 and a packer bar 85 mounted on the underside of the blade. The blade and packer bar are clamped against the underside of a rigid crosshead beam 86 by means of a clamp bar 87 and screws 88 which pass through slots in the blade.

The crosshead 83 is reciprocated by a pair of spaced-apart connecting rods 91 each pivotally connected at its forward end with the rear face of the crosshead. The rearward ends of the connecting rods are connected with crank pins on crank discs 92 which are mounted on opposite ends of a crankshaft 93. The crankshaft is driven by a sprocket 95 for rotation in bearings 96. (See FIGURES 6, 7 and 8.)

Each end of crosshead 86 is supported by a U-shaped slide block 101 which stradles a short, longitudinal, horizontal supporting rail 102 mounted on and projecting inwardly from a side frame member 103 of the machine as best shown in FIGURES 8 and 9. The upper and lower arms of block 102 are slotted at 104 to receive bearing members 105 of suitable material such as nylon. Bearing members 105 ride in grooves 106 in the top and bottom surfaces of rail 102 and are secured in the slots 104 by screws 107 which permit relative vertical movement, height adjustment being obtained by pressure adjusting screws 108 in FIGURE 10. This permits the ends of the crosshead 86 and, hence, the blade 73 to be adjusted vertically in the proper cutting relationship with stationary blade 72. The slots 104 and grooves 106 prevent longitudinal movement of the crosshead and blade 73 in a direction transversely of the machine.

Mounting plate 74 has notched ends overhanging and resting on the rails 102 as shown in FIGURE 8. The mounting plate is biased downward by springs 110 on upstanding screw studs 111 which pass loosely through the mounting plate and are threaded into the rails 102. Thus, the rails 102 are the vertical positioning elements for both blades 72 and 73 which have a novel relationship as will presently be explained.

In order to prevent overheating of the bearing members 105, each rail 102 is made hollow to contain therewithin a cooling chamber 115. Pipe connections 116 and 117 provide for circulating a cooling liquid through the chambers. This arrangement permits the slide bearings to operate without added lubricant which helps to keep the core strips clean and reduces maintenance on the machine. In some end uses of the honeycomb the core strips are exposed to view and must present a neat and clean appearance.

The stationary blade 72 is almost normal to the direction of motion of the movable blade but not quite as one end of the stationary blade should be contacted first by the moving blade so that severing of a strip from the combined webs takes place with a scissors-like shearing action, the cutting being done at a point which moves along the blades. This shear angle of the stationary blade from the normal is about one-sixteenth inch to one-eighth inch from end to end of a six foot blade and is attained by the taper of the wedge shim 77 which is interposed between the blade 72 and its mounting plate 84. This is to say that one end of the stationary blade is slightly forward from its opposite end. The under surface of the stationary blade has a little rake rearward from its cutting edge and the forward surface of the moving blade has a little rake downward from its cutting edge which is in the plane of its upper surface.

Another novel feature of the blade relationship to obtain a scissors action is that the stationary blade 72 slopes slightly along its length. Its rearwardly extending end is from one-sixteenth inch to one-eighth inch higher than its forwardly extending end, the rearward end having its cutting edge spaced about one thirty-second inch above the moving blade so that first contact between the blades occurs about two inches in from the end of the blades, before the moving blade makes cutting engagement with the edge of the web. The major portion of the length of the stationary blade is then slightly below the cutting edge of the moving blade. This vertical adjustment of the stationary blade is obtained by the insertion of shims under the notched supporting ends of mounting plate 74.

As the reciprocating blade 73 moves forwardly it first passes freely under the rearward and upper edge of the stationary blade and then makes contact with the stationary blade at the horizontal juncture of the two blades and starts to cut the paper web at this end of the blades. Further forward movement of the reciprocating blade raises the stationary blade and mounting plate against the force of springs 110 causing the contact point between the two blades to move along the blades and cut the web with the desired scissors action. Thus the entire thrust of the reciprocating blade is applied at one point of cutting instead of along the entire line of cut.

Rotation of the crankshaft 93 reciprocates the movable blade 73 which acts to sever strips from the end of the combined core stock webs as they are fed downwardly from the nip rolls. The forward face of each composite strip will have applied thereto vertical adhesive lines from the second applicator 42 and as each severed strip is pushed into the packer throat 80 it will come into back-to-face contact and congruent registry with the previously severed composite strip and be adhered thereto. This results in the packer throat being filled and packed with such strips in registry and adhered together as shown in FIGURE 6.

The throw of the crank discs is such, and the crosshead and its blade are so located, that after a strip is cut the blade 73 and packer bar 85 enter the packer throat far enough so that any spring back of the strip pack will not return the strip to interfere with the feeding of the web end against the lower packer plate 81 upon return of the crosshead to separate the blades' edges. Further, the spring back is limited by the dropping of the stationary blade partially behind the upper edge of the strip pack as the moving blade is withdrawn, thus holding the strip pack within the throat.

As a strip is cut from the web, the new end of the web rides on the upper face of the moving blade 73 and then when the blade withdraws the end of the web moves down to plate 81 which serves as a gauge plate for the next cutting operation. It is to be remembered that the two webs 3, 5 are in adhesion along longitudinal, spaced-apart, parallel vertical lines from the applicator 41 as the strips are severed therefrom and, hence, each severed strip is composed of two individual web portions 3a, 5a (FIGURE 15) and these lines of web adhesion are spaced laterally between the external lines of adhesive from the second applicator 42 which adheres the successive cuttings together in the packer throat. The packing of the strips one at a time in the packer throat produces a good bond with less adhesive than is required for the conventional method of pressing a large stack of glue lined sheets prior to cutting the strips.

*Core web take-up*

The combined core stock webs 3, 5 move vertically downward from between the constant speed powered nip rolls 37, 38 a distance of about four feet to the cyclically operated strip cutter 71. This cyclic operation of the cutter requires a take-up for the slack in the web resulting from its constant speed at the nip rolls and its momentary stoppage during cutting cycles. The second adhesive line applicator 42 is just below the nip rolls, and between the applicator and the cutter is a take-up 201 for this web slack, as best shown in FIGURE 8.

As cutter speeds may exceed a hundred cycles per minute, it is necessary that any moving parts in the take-up be as light as possible and highly responsive to slack in the combined webs. Further, the forward face of the combined webs has adhesive lines thereon. With these considerations in mind, there has been formed between the applicator and the cutter a flexible and resilient vertical throat for the passage therethrough of the combined webs. This throat acts as a take-up because of its resiliency.

The throat has a rearward side in the form of a fixed plate 202 that extends transversely of the machine and from the backup roll 48 of the applicator (FIGURE 3) to a lower end which just clears the crosshead 86. The forward face of the plate 202 is contiguous with the rearward face of the web 3 in its vertical run from the nip rolls. Bars 203, 204 extend transversely of the machine and are secured to the plate and the frame of the machine to support the plate 202 in this position.

Forward of the combined webs is a series of spaced-apart parallel cords each of which has a portion 206 thereof in a vertical run which is contiguous or slightly spaced from the webs. Each of the cords passes over a cord bar 207 placed transversely of and secured to the frame of the machine just below the applictor discs 47 of the second applicator 42. Also, each of the cords passes through a separate opening 208 in the top of the mounting plate 74. This opening slants downwardly so as to emerge from the rear face of the mounting plate above the blade 72. The ends of each cord from another approximately vertical run 209 and the ends are joined together by the coiled tension spring 210.

The top edge of the cord bar 207 should be rounded and smooth so that springs 210 will have no difficulty in tensioning both runs 206, 209 of the cords evenly. The cords are spaced two to four inches apart and the spacing is such that each cord is located between adjacent adhesive lines on the face of the web. It is this series of cord runs 206, 209 and their springs 210 that provides the resiliency to the take-up throat formed by the cords and plate 202.

Whenever travel of the web in the take-up 201 is interrupted by the end of the combined web contacting the bottom plate 81 of the packer and then contacting the top surface of the movable blade 73 as a new end is cut on the web, the web continues to feed into the take-up from the nip rolls and the applicator. As the web feeds into the take-up with the end thereof stopped, the portion of the web above the fixed blade and its support forms a series of transverse waves which increase in height and often in number as the web continues to feed into the take-up. These web waves force the spring tensioned cord runs 206 contacting the web away from the fixed plate 202, as shown in FIGURE 6.

Then when the movable blade 73 and its support return out of the packer throat and the web can again feed past the blade edges, the tension of the cords forces out the waves in the web in the take-up to effect the feed past the cutter blades and against the bottom plate stop 81. The cords are tensioned to effect the above described action. This feeding action by the take-up is very fast and is a factor in the high speed strip cutting obtainable with the present machine. The width of the strips cut from the web, or distance between cuts, times the speed, or cycles of the cutter, determines the peripheral speed of the nip rolls, and this relationship is fixed by the machine's drive means to the various parts.

It is to be noted that the free face adhesive lines from applicator 42 are so spaced apart on the forward web face in the take-up 201 that the cords 206 are between the lines, and that these cords extend to a point a short distance above the fixed cutter blade. This arrangement prevents any contact between the adhesive lines and the cords, and the cords keep the adhesive lines from contact with the cord bar 207 and most of the beam 74 and fixed blade 72. The arrangement also keeps the combined web moving freely to the cutter blades as adhesive from the web does not transfer therefrom to parts of the machine. The little that is transferred to the blade edges soon reaches a maximum amount so that as some transfers to the edges an equal amount is carried therefrom by the web and severed strips. This amount that accumulates on the blade edges is not enough to appreciably widen or smear the lines applied to the web by the second applicator 42. Preferably, the rear face of mounting plate 74 is covered with a smooth plastic sheet 215 to reduce sliding friction, prevent adhesive accumulation and facilitate cleaning off any adhesive that may accumulate on this surface.

Core expansion

Packing of the severed strips into the packer and their adhesion together forms the core 211 in FIGURES 1B, 15, 16 and 17. This pack of strips is called a core as it finds use in the formation of a panel in which the core has a sheet adhered to at least one face thereof. It is usual for the core to be expanded before incorporation with the face sheet or sheets, although the degree of expansion may vary with the spacing of the adhesive lines and the needs or uses of the product. In the present disclosure, the formation of the core is a continuous process of strip integration and so is its expansion continuous and continuous upon its formation. That is, as each web strip, be it from either web of the core stock webs 3, 5, leaves the packer, it begins to move from its adjacent strip, except at the lines of adhesion. This movement of strip from strip is regulated and continuous until the desired separation is achieved.

Figure 15:
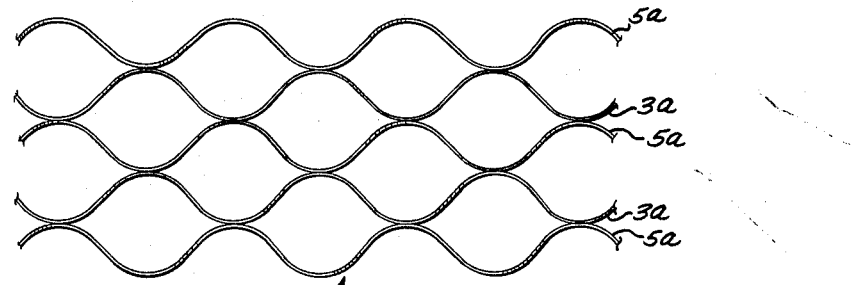
FIGURE 15 is a plan view of a portion of an expanded core.

As here disclosed, this separation of the strips is in a direction normal to the strips' faces, and results in a core having somewhat the form shown in FIGURE 15 of the drawings. This expansion of the core is effected by a portion of the machine called an expander and is spaced a short distance from the outlet opening of the packer. This expander 221 is formed with a horizontal opening, or throat, that is coaxial with the throat of the packer and generally co-extensive therewith in cross section. Complete expansion of the core as desired does not take place immediately as the strips leave the packer. This is one of the reasons for the separation of packer and expander.

The expander pulls on the core to effect expansion thereof and may be considered as pulling the core from the packer. The rate at which the core passes through the expander in relation to the rate of core formation in the packer determines the expansion of the core, i.e., the size of the openings therein. As the core expands, its width shortens from that of the length of the strips, the web width, to the expanded width. The core thickness is that of the strip width in a vertical direction.

Between the packer and the expander two operations may be, and preferably are, performed on the core in addition to the expansion. The first of these operations is effected immediately after the core has ceased to expand. This is a humidifying operation in which moisture is added to the core so that the stresses created in the core strips by the expansion are relieved. The second operation follows the humidification, and is a drying step to remove some of the added moisture so that the adhesive bonds will not be weakened as final setting thereof may not have taken place at this point of the complete process. The performance of either or both of these two operations is important and necessary if the core is to hold most of its expansion and is not to have face sheets applied thereto which would hold the core in its fully expanded condition.

Humidification is effected by placing elongated nozzles 222, 223 in opposition above and below and across the core, and providing a steam inlet conduit 224 to the upper nozzle 222 and a steam and condensate outlet 225 from the lower nozzle 223 as shown in FIGURE 1B. The nozzle's elongation is transversely of the core and its direction of movement. The upper nozzle acts to direct the incoming steam downward through the core openings, which steam should be near and above its saturation point. With cores made from most papers, the time required for relaxation of internal stresses is short so that the dimension of the nozzles is small in the direction of core travel. Following the steam nozzles are drying chambers 226, 227 which may be of the same general construction and similar location as the steam nozzles with inlet 228 and outlet 229 openings. Hot air is passed through the chambers and the core to effect drying thereof.

Heat, alone, applied to the expanded core will cause it to set in its expanded condition. It takes more time for the core stresses to be relaxed and for the core to set by the use of heat alone than it does by the use of hot steam. In either case, it is believed that the relaxation of stresses is due to the movement of moisture between the fibers of the strips. There is generally eight to fifteen percent of moisture in paper. When the core is heated, this moisture will move through the paper strips to lubricate the fibers thereof to allow them to move one to the other to effect the relief of stresses and the setting of the strips in their new shape in the expanded core.

*Face sheet preparation*

Following the conditioning of the expanded core, it passes into the expander 221 (FIGURE 1B) which performs another function in addition to that of pulling on the core to effect the above described expansion thereof. This other function is that of applying to the core and laminating therewith the face sheets 2, 4.

The upper face sheet 4 is taken from the front roll of those on the roll unwind stand. This sheet is led under its stand threading roll 27, then forward under a foot roll 231 which is located slightly above and rearward of the first foot threading roll 31. The sheet then goes to the top of the machine where it passes over its first head threading roll 232, then forward over the core strip cutter 71, and to and over in contact with a second head roll 233 located above and rearward of the expander 221. From here the sheet 4 goes down and rearward to a first sheet adhesive applicator 234 shown in FIGURE 1B and enlarged in FIGURE 11.

In this applicator the sheet receives a coating of adhesive on its lower surface. This is the sheet's lower surface as it leaves the applicator from which it travels to the expander where it is placed in registry with the expanded core 211 as core and sheet enter the expander, so that the side of the sheet carrying the adhesive moves into contact with the edges of the core strips forming the upper face of the core.

The first sheet adhesive applicator 234 is constructed in the form of a three-roll roll-stand in which there is an elongated adhesive pan 236 forming the base of the stand which is supported on the frame of the machine so that the pan extends transversely thereof. Adhesive is circulated through the pan from an inlet pipe 63 to an overflow pipe 64 as in the line applicators 41, 42. This adhesive circulation is connected to the same system which supplies adhesive to the line applicators 41, 42. At each end of the adhesive pan and secured there to is an upright member 241 in which is journaled a shaft end of each of the three contacting rolls of the stand.

The bottom roll 242 of the stand is the adhesive pickup roll, and is placed so that a portion thereof is immersed in the adhesive. The roll 243 above the pickup roll acts as a doctor roll to the pickup roll and as an applicator roll in the transfer of adhesive to the sheet as its upper portion is contacted by the underside of the sheet 4. The top roll 244 acts as a threading roll in leading the sheet thereover and to the applicator, and as a backup roll to the applicator roll 243 as the sheet passes therebetween. Each of the rolls travels at the same surface speed due to gears. One gear 245 is secured to each roll at an end thereof and coaxial therewith, and in mesh with the gear of the adjacent roll or rolls. The applicator rolls are driven by the sheet passing through the applicator, which sheet is in turn driven by the expander 221.

The lower face sheet 2 is taken from the rear roll of those on the roll unwind stand. The sheet passes forwardly of the machine under the strip cutter, then under, around, and in contact with a foot threading roll 247 located below the expander 221. From this foot roll the sheet moves a short distance rearward and upward to the second sheet adhesive applicator 248. In this applicator the sheet receives a coating of adhesive in its upper face, i.e., its upper face as it leaves the applicator. From this applicator the sheet travels to the expander where it is placed in registry with the lower face of the core 111 as core and sheet enter the expander with the upper face of the sheet in contact with the lower face of the core and the edges of the strips which make up such face. Bonding of core and face sheets takes place in the expander.

The second sheet adhesive applicator 248 is of the same construction as the first one, and the reference numerals applied to the first one are applied to the identical parts of the second one. The second applicator is located directly below the first one, and is supported on the frame of the machine. The first one is located above the course taken by the core in moving from the cutter to the expander, and the second one is located below such course. The sheet 2 wraps the backup roll 244 in the same manner as in the first applicator 234 but its direction is reversed from the first applicator so that the direction of rotation of all the rolls in the second stand is reversed from those of the first stand. However, this does not otherwise change the operation of one applicator from the other.

*The expander*

Figure 13:
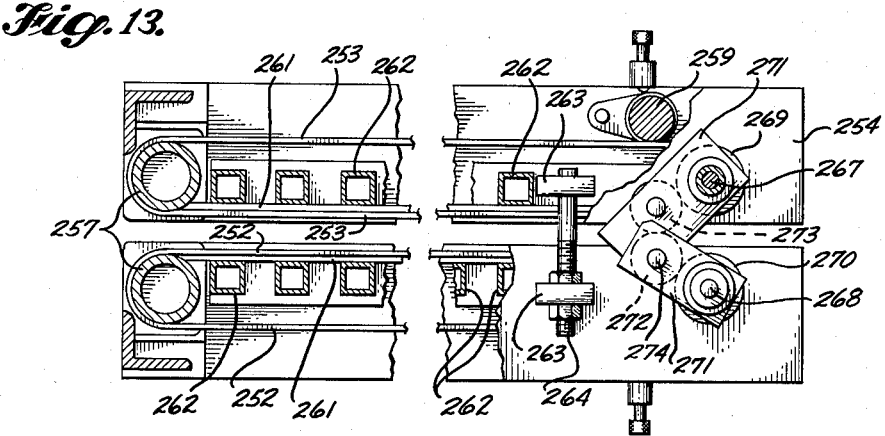
FIGURE 13 is an elevational right side view of the expander with parts broken away taken on the line 13—13 of FIGURE 12.

The expander is shown in detail in FIGURES 12 and 13, plan and elevation, respectively, with parts broken away. The expander forces the face sheets onto the core and grips the core and the face sheets to carry the assembly 251, FIGURE 1B, called the panel, by means of endless belts 252, 253, one above and one below and each bearing on the assembly. The length of the belts is such that the adhesive carried by the face sheets 2, 4 has sufficient time in the expander to set enough to hold the sheets to the core so that when the panel leaves the expander, separation of core and sheets will not occur. From the expander the panel may be subjected to other operations not part of the present disclosure.

Each of the belts 252, 253 is carried by a section of the expander, and both sections are of the same construction but for the fact that the top section is supported on the frame of the machine and carries the bottom section which is adjustably spaced from the top section. Each section has a pair of spaced-apart side plates 254 carrying on the inside near each end of bearing 256 for the end shaft of a belt roller of which there are two 257, 258 in each section. One of the belts 252, 253 is placed around each of these pairs of rollers. An idler roller 259 is placed across each belt with its bearings carried by the side plates 254, and in adjustable contact with the run of the belt away from the expander's throat, so that the belts may be properly tensioned.

The runs of the belts that are in opposition to form the core and sheet gripping surfaces are each backed by a plate 261 which is contiguous with and extends the width of the belt and between the lines of contact of the belt with its rollers. This plate is supported by a plurality of members 262 extending between and supported by the side plates 254. A pair of eyes 263 are secured to the outside of each side plate 254 in spaced-apart relationship and so that the openings therein are in vertical alignment between the superimposed plates. A bolt 264 passes through each pair of vertically aligned eye openings and nuts on each of these bolts hold the bolts in the eyes and the expander sections in fixed but adjustable relationship so that the pressure, or grip, of the expander belts on the panel assembly may be adjusted to the desired degree.

The belts are driven by a sprocket 266 mounted on an extension of the right hand end of the shaft 267 of the upper rear belt roller. The two belts are maintained in synchronism by a flexible train of gears between the sprocket shaft 267 and the belt roller shaft 268 directly therebelow. Each of these shafts has a spur gear 269, 270 secured thereto, and on each side of each gear is pivoted a plate 271. In mesh with each of the shaft gears is an idler gear 272, 273 pinned between a pair of the plates 271. One 274 of the idler gear's pins extends through both pairs of plates, one pair of plates being spaced apart to lap the other pair, and acts as a connecting pivot for the plates. With this arrangement the expander sections can have their spacing adjusted without a separate adjustment of the drive of the lower belt from the upper. The plates of the gear train merely pivot on their common pin 274, as the gears in the flexible train are large enough and the plates are long enough so that this adjustment can be achieved.

The sprocket 266 is driven at a speed with respect to the rate of oscillations of the strip cutter 71 that will give the desired expansion of the core 211. Further, the expander furnishes the drive for the face sheets 2, 4 and the unwinding of their respective rolls, and the pressure to laminate them with the core. Generally, the expander belts 252, 253 have surfaces in contacts with the sheets 2, 4 of sufficient resiliency and roughness to firmly apply the sheets to the core and to provide the traction needed to pull the assembly 251 through the expander.

Power distribution

FIGURES 1B and 14 show the power distribution for operating the machine. The rolls of paper 13 are unwound by the pull on the webs 3, 5, and the sheets 2, 4. All of the threading rolls are driven by the webs and sheets in contact therewith. The first adhesive line applicator 41 is driven by the web 5 contacting the head threading rolls 32, 33 which drive the chains 58, 57 which drive the applicator. Similarly, driven by the sheets 2, 4 are the rolls of the two sheet adhesive applicator roll stands 234, 248.

The other moving parts of the machine are driven from a single power source, an electric motor 281 mounted on the bed 11 of the machine. This motor, through a chain 282 located outboard of the right side of the machine, drives a first cross shaft 283 located rearwardly of the motor, below the strip cutter 71, and just above the run of the bottom face sheet 2. From outboard of the left hand side of the machine, this cross shaft 283, through a chain 284, drives a second cross shaft 286 rearwardly of the web take-up 201 at about the middle of the height of the machine's frame. Medially of this second cross shaft 286 a chain 287 extends downward to drive the crankshaft 93 of the strip cutter 71, and thereby drive the strip cutter.

From the outboard of the right hand side of the machine, this second cross shaft 286 has a short chain 288 extending upward and forward to a short idler shaft 289. From this idler shaft a chain 291 extends upward and forward to a large sprocket 292 located on the outboard end of the shaft of the second nip roll 38 thereby to drive the nip rolls 37, 38.

The drive to the expander is along the bottom of the machine and outboard of the right side thereof, from the first cross shaft 283 to the expander sprocket 266 with a speed changer 293 intermediate of the V-belts 294, 295 of the drive. It is to be understood that when a chain is described as extending from one shaft to another, such description includes a sprocket secured to each of the shafts and that such sprockets carry the chain for the transmission of power between such shafts.

The various sprockets, pulleys and gears mentioned in the foregoing description of the present machine are so proportioned as to drive the various parts of the machine with the relationship set forth in such description and so as to achieve the disclosed functioning and objectives.

The product

Figure 16:
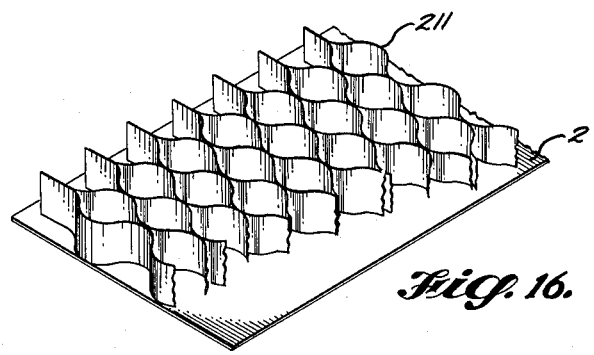
FIGURE 16 is an isometric view of a portion of a panel having a single face sheet.
Figure 17:
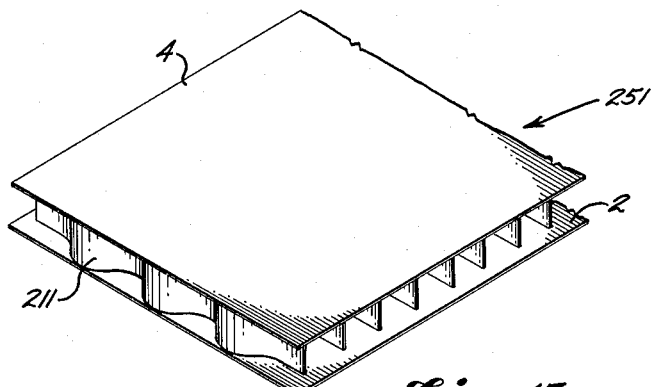
FIGURE 17 is an isometric view of a portion of a panel having two face sheets.

FIGURE 15 is a plan view of a portion of an expanded honeycomb and FIGURES 16 and 17 are isometric views of portions of other forms of the products of the present invention. The first product to be produced by the machine is the compacted honeycomb or core found in the throat 80 of the packer. This compacted core may be used where it is required that the core carry great face loads. In fact, the number of core strips per running foot of expanded core should be directly proportional to the expected face load per square foot of core. Generally, as the strip density is increased, strip density being the number of strips per running foot of core, the distance between the adhesive lines is lessened so that the cell dimensions are equal. That is, each cell opening is preferably symmetrical, its dimensions longitudinally and transversely of the panel being substantially equal. This then becomes an expanded honeycomb of small cell size. Changing the distance between the adhesive lines is only a matter of changing the distance between the applicator discs 47. Further, due to the process of relieving the expansion stresses and obtaining a stable expansion, the core can be laminated with other laminae without stretching the core during the lamination process.

The second product is the expanded honeycomb or core 211, or grate as it also may be described. A face view of a portion of such a honeycomb is shown in FIGURE 15. These first and second products have various uses just as a honeycomb material without any face sheets attached. They are used, for example, as separators in cartons containing fragile articles such as radio tubes and fruits such as apples and pears. They also have ornamental and decorative uses both flat and formed into circles, rectangles, cones and cylinders. The honeycomb may be die cut to intricate shapes and designs. The cells may be filled with translucent expanded plastic for signs and like purposes. In such applications the cell sizes and thickness of the honeycomb will vary widely depending upon the use. To make such honeycomb without face sheets it is only necessary to omit the face sheets 2 and 4 in FIGURE 1B and take the expanded, or partially expanded honeycomb from the expander 221, the humidifying and drying steps being effective to maintain the cells in the desired open condition without any tendency to collapse.

Also, it is often desired to ship the honeycomb in its most compact and completely collapsed condition for space economy. In such case, the honeycomb can be taken directly from the packer throat 80 as soon as the glue lines have set and without undergoing the expanding, humidifying and drying steps. These steps, if desired, would then be performed by the fabricator who might be at a great distance from the manufacturer of the compacted honeycomb.

In FIGURE 16 there is an isometric view showing a portion of a panel consisting of an expanded core 211 and a single face sheet 2 adhered to the bottom face of the core. This panel may be easily bent longitudinally thereof with the sheet interjacent the core when bent, and may be used in the formation of a curved double faced panel. The second face sheet would be applied while the single faced panel is held in the desired curved condition. The product of FIGURE 16 also has uses other than in manufacture of panels, as for example, package dividers where each face sheet 2 forms a divider between layers. Such a product is readily made in the present machine by merely omitting one or the other of the face sheets 2, 4.

The third product illustration, FIGURE 17, is another isometric view of a portion of a panel 251 consisting of an expanded core 211 and a sheet 2, 4 adhered to each side of the core. The face sheets hold the core fixed against expansion or contraction, and serve as surface stress members when the panel is subject to bending forces normal to the faces thereof.

An important feature of the present product is that the core and panels made therefrom can be made with very precisely uniform thickness throughout. This is due to the fact that the machine can be adjusted to cut strips of uniform width from end to end, and, thus, from these uniform strips will result a panel having uniform thickness. This is important when these cores and panels are used in the manufacture of doors and table tops, for example.

*Summary*

The process of making the herein described honeycomb or core 211 is a process of progressive integration in which incremental strips cut from the end of a web are integrated together, each as it is severed, to form a compact grate or honeycomb and in which such compact assemblage is continuously expanded by increments to produce an endless ribbon of cellular product. In making a panel, face sheets are continuously laminated and integrated to such cellular core by increments of such sheets to produce a laminated cellular panel.

By the present process, the honeycomb or core strips are cut from only two laminated webs. This means that, with proper adjustment of the strip cutter 71, each cut strip is precisely the same size as every other strip whereby the core has uniform thickness throughout its length and width and the difficulties of cutting a thick block of strips are obviated. Even in possible variations of the process not more than a small number of core webs would be cut at the same time. Also, strip uniformity is achieved by cutting the laminated web with a blade moving normal thereto so that both strips of the lamination are cut to the same width, and not one a fraction more or less than the other.

The machine for the performances of this process and the production of the products is simple in design, construction, and function. Operation of the various parts is synchronized by the web and sheet travel and by a single power source 281. The middle paper rolls 13 of the roll unwind stand 12 provide webs from which strips are cut to form the core. Prior to severance of the strips, two of the webs 3, 5 are brought together at the second foot threading roll 34 with parallel longitudinal lines of adhesive therebetween applied by the first adhesive applicator 41 to integrate the two webs into one combined web; and medially of each pair of web integrating lines of adhesive, other parallel lines of adhesive are applied to the forward free face of the combined web.

The strip cutter 71, employing a reciprocating knife blade having straight line motion, severs strips from the end of the combined core web, and as each strip is severed it is forced into a packer throat by the cutter blade, where the strips are in face-to-face contact and congruency and where the adhesive on the strips sets to form the core 211. The setting of the adhesive in the packer is sufficient to hold the strips together as they leave the packer and as the core is expanded by the pull of the expander belts 252, 253. In its expanded condition the individual core strips 3a, 5a take on a more or less sinusoidal shape longitudinally thereof, transversely of the core, and are joined together at their nodes and in nodal opposition to form between the strips open cells which are acuminate in form, resembling a honeycomb.

The core in its travel between packer and expander and after expansion, is humidified to relieve the internal stresses in the strips due to the expansion flexure, and dried to remove excess moisture and to set the strips in the expanded condition of the core. As the core enters the expander, each face of the core has applied thereto a sheet led forward of the machine from the unwind stand. Each of these sheets carries adhesive on its surface of contact with the core so that as the sheets and core pass through the expander the sheets are integrated with the core to form a panel laminate assembly 251.

Adhesive is applied to the face sheets by the sheet adhesive applicators 234, 248. The process of panel integration is continuous resulting in panel units of any desired length. The edges of the panel may be trimmed to remove excess face sheet material and strip ends. Also, the panel may be split longitudinally thereof or trimmed to any desired width.

From the foregoing description, it will be seen that applicant has devised a process for the manufacture of a continuous cellular core and panel incorporating such core by the incremental integration of the parts thereof. Applicant has devised a simple machine for carrying out such process. And, further, the core and panel resulting from such process and produced by such machine are new in their continuity and uniform dimensions.

The honeycomb or cellular core panel produced by the present process and machine may be used as a filler in wood veneer faced panels for doors, tables, or curtain walls. The honeycomb alone may be used for decorative effects and package dividers, and the core with one face sheet only thereon may be used for package dividers and may be secured to walls by its face sheet for decoration and for sound absorption. The panel may be used as a beam, and several panels laminated together face-to-face and edge-to-edge with each layer staggered to contiguous layers so as to overlap the joints, will form lightweight slabs or beams of great strength. The above are only a few of the applications and uses for the present product.

Further, the present machine may process other materials than paper or light card stock. Thin sheets of metal or plastic, or cloth, may be similarly treated with suitable adhesives.

Having thus described the various features of my invention, the process, the products, a machine for the performance of such process for the production of such products, and examples of the use of such products, I claim:

1. The process of making honeycomb comprising continuously feeding superimposed webs toward a cutting zone, said webs being adhered together along spaced first lines parallel to the direction of such feed, and one of the outer faces of said superimposed webs having second lines of adhesive parallel to and between said first lines,
    cutting strips transversely from said superimposed webs in cyclic operation in said cutting zone and interrupting said feed movement in said cutting zone during certain intervals of said cyclic operation without interrupting said continuous feed,
    accumulating slack in said webs between said continuous feed and said cutting operation during said intervals as a result of said continuous feed,
    feeding said slack to said cutting zone during other intervals of said cyclic operation, and
    packing said cut strips into a stack one after another as they are cut to adhere the strips together along said second lines and form a compact honeycomb pack.

2. The process of claim 1 in which said slack is fed to said cutting zone more rapidly than said continuous feed movement.

3. The process of claim 1 in which said continuous feed causes the slack to be formed into transverse waves and in which the slack is fed to the cutting zone by applying pressure to flatten the waves.

4. The process of claim 1 in which said first lines of adhesive are placed on one of the opposing faces of said webs and said webs are brought into registry and superposition prior to said feeding.

5. The process of claim 1 in which said second lines of adhesive are placed on one of said faces between said feeding and said slack forming.

6. The process of claim 1 in which the upper and lower cut edges of said strips are guided into said stack during said packing.

7. The process of claim 1 in which said webs are fed substantially vertically downward into said cutting zone and said cut strips are packed in a substantially horizontally progressing pack.

References Cited by the Examiner
UNITED STATES PATENTS

| | | | |
|---|---|---|---|
| 1,538,635 | 5/1925 | Hahn | 83—623 |
| 2,428,979 | 10/1947 | May | 156—291 X |
| 2,477,852 | 8/1949 | Bacon | 161—68 |
| 2,518,164 | 8/1950 | Meyer | 156—513 |
| 2,644,777 | 7/1953 | Havens | 161—69 |
| 2,731,379 | 1/1956 | Wheeler | 156—291 X |
| 2,734,843 | 2/1956 | Steele | 156—291 |
| 2,769,481 | 11/1956 | Meanor et al. | 156—469 |
| 2,983,640 | 5/1961 | Knoll et al. | 156—197 |
| 3,007,834 | 11/1961 | Moeller et al. | 156—197 |
| 3,035,952 | 5/1962 | Gwynne | 156—197 |
| 3,066,566 | 12/1962 | Bottenhorn | 83—623 |
| 3,082,142 | 3/1963 | Payne et al. | 156—197 |

ALEXANDER WYMAN, *Primary Examiner.*

MORRIS SUSSMAN, *Examiner.*